United States Patent
Zhuang et al.

(10) Patent No.: US 9,843,951 B2
(45) Date of Patent: Dec. 12, 2017

(54) METHOD AND APPARATUS FOR DETERMINING PERFORMANCE INDICATOR OF COMMUNICATIONS NETWORK

(71) Applicant: Huawei Technologies Co., Ltd., Shenzhen (CN)

(72) Inventors: Hongcheng Zhuang, Shenzhen (CN); Shmelkin Dmitri, Shenzhen (CN); Andrian Beletchi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 15/185,932

(22) Filed: Jun. 17, 2016

(65) Prior Publication Data
US 2016/0302097 A1    Oct. 13, 2016

Related U.S. Application Data

(63) Continuation of application No. PCT/CN2013/089956, filed on Dec. 19, 2013.

(51) Int. Cl.
*H04W 4/00* (2009.01)
*H04W 24/08* (2009.01)
(Continued)

(52) U.S. Cl.
CPC ......... *H04W 24/08* (2013.01); *H04L 43/0876* (2013.01); *H04L 43/50* (2013.01);
(Continued)

(58) Field of Classification Search
CPC ..... H04W 24/08; H04W 24/02; H04W 28/08; H04W 84/18; H04M 3/2263; H04L 43/0876; H04L 43/50
(Continued)

(56) References Cited

U.S. PATENT DOCUMENTS

2014/0169160 A1* 6/2014 Sridhar ............. H04W 28/0289
370/229
2016/0212758 A1* 7/2016 Leung ................... G06Q 10/00

FOREIGN PATENT DOCUMENTS

| CN | 102404778 A | 4/2012 |
| CN | 102625369 A | 8/2012 |

(Continued)

OTHER PUBLICATIONS

Zhuang et al.,"Traffic-Based Dynamic Spectrum Management for Inter-Cell Interference Coordination in LTE Networks," IEEE Global Communications Conference, pp. 5062-5067, Institute of Electrical and Electronics Engineers, New York, New York, (Dec. 3-7, 2012).

*Primary Examiner* — Marcos Batista
(74) *Attorney, Agent, or Firm* — Leydig, Voit & Mayer, Ltd.

(57) ABSTRACT

The present disclosure provides a method and an apparatus for determining a performance indicator of a communications network. The method includes: acquiring bandwidth utilization rates, throughputs of GBR services, and throughputs of non-GBR services of multiple areas included in a communications network; determining load statuses of the multiple areas according to the bandwidth utilization rates of the multiple areas; determining rate requirements of the non-GBR services of the multiple areas according to the load statuses of the multiple areas, the throughputs of the GBR services of the multiple areas, and the throughputs of the non-GBR services of the multiple areas; determining rate requirements of the GBR services of the multiple areas; determining loads of the multiple areas according to the rate requirements of the GBR services and the rate requirements (Continued)

of the non-GBR services of the multiple areas; and determining a load-associated key performance indicator of the communications network.

20 Claims, 7 Drawing Sheets

(51) Int. Cl.
    *H04W 28/08*     (2009.01)
    *H04W 24/02*     (2009.01)
    *H04L 12/26*     (2006.01)
    *H04M 3/22*     (2006.01)
    *H04W 84/18*     (2009.01)

(52) U.S. Cl.
    CPC ......... *H04M 3/2263* (2013.01); *H04W 24/02* (2013.01); *H04W 28/08* (2013.01); *H04W 84/18* (2013.01)

(58) Field of Classification Search
    USPC ........................................ 455/422.1; 370/338
    See application file for complete search history.

(56) References Cited

FOREIGN PATENT DOCUMENTS

| | | |
|---|---|---|
| CN | 103037439 A | 4/2013 |
| CN | 103079235 A | 5/2013 |
| EP | 2337395 A1 | 6/2011 |
| WO | WO 2013019153 A1 | 2/2013 |
| WO | WO 2013124435 A1 | 8/2013 |

\* cited by examiner

130

| Determine service requirement ratios of non-overloaded areas in multiple areas according to throughputs of GBR services of the multiple areas and throughputs of non-GBR services of the multiple areas, where the service requirement ratios represent ratios of rate requirements of the non-GBR services to rate requirements of the GBR services | ~ S131 |

| Determine service requirement ratios of overloaded areas in the multiple areas according to the service requirement ratios of the non-overloaded areas in the multiple areas | ~ S132 |

| Determine a rate requirement of a non-GBR service of each area in the multiple areas according to the service requirement ratios of the non-overloaded areas in the multiple areas, the service requirement ratios of the overloaded areas in the multiple areas, the throughputs of the GBR services of the multiple areas, and the throughputs of the non-GBR services of the multiple areas | ~ S133 |

```
┌─────────────────────────────────────────────────────────────┐
│ Determine, according to throughputs of GBR services of pixels │
│    included in multiple sub-areas and throughputs of non-GBR  │
│  services of the pixels included in the multiple sub-areas,   │
│  service requirement ratios of pixels included in non-overloaded sub-areas │
│  in the multiple sub-areas, where the service requirement ratios of │
│    the pixels represent ratios of rate requirements of the non-GBR │
│   services of the pixels to rate requirements of the GBR services of │
│                          the pixels                          │
└─────────────────────────────────────────────────────────────┘
```
~ S134

```
┌─────────────────────────────────────────────────────────────┐
│  Determine, according to the service requirement ratios of the │
│    pixels included in the non-overloaded sub-areas, service   │
│  requirement ratios of pixels included in overloaded sub-areas in │
│                    the multiple sub-areas                     │
└─────────────────────────────────────────────────────────────┘
```
~ S135

```
┌─────────────────────────────────────────────────────────────┐
│   Determine, according to the service requirement ratios of the │
│    pixels included in the non-overloaded sub-areas, the service │
│  requirement ratios of the pixels included in the overloaded sub-│
│  areas, the throughputs of the GBR services of the pixels included │
│   in the multiple sub-areas, and the throughputs of the non-GBR │
│    services of the pixels included in the multiple sub-areas, rate │
│ requirements of the non-GBR services of the pixels included in the │
│                      multiple sub-areas                       │
└─────────────────────────────────────────────────────────────┘
```
~ S136

```
┌─────────────────────────────────────────────────────────────┐
│   Determine a sum of rate requirements of non-GBR services of │
│  pixels included in each sub-area in the multiple sub-areas as a rate │
│    requirement of a non-GBR service of each of the sub-areas  │
└─────────────────────────────────────────────────────────────┘
```
~ S137

FIG. 4

METHOD AND APPARATUS FOR DETERMINING PERFORMANCE INDICATOR OF COMMUNICATIONS NETWORK

CROSS-REFERENCE TO RELATED APPLICATIONS

This application is a continuation of International Application No. PCT/CN2013/089956, filed on Dec. 19, 2013, which is hereby incorporated by reference in its entirety.

TECHNICAL FIELD

The present patent application relates to the field of communications, and in particular, to a method and an apparatus for determining a performance indicator of a communications network.

BACKGROUND

As users have ever-increasing requirements on rates of data transmission, a development trend of base station miniaturization becomes increasingly obvious. Therefore, mobile communications networks are more dynamic, a quantity of network elements that need to be maintained by a carrier dramatically increases, and accordingly, maintenance expenditure that needs to be invested becomes increasingly high. In addition, high mobility of applications of a user leads to increasingly frequent changes in network services. A self-organizing network ("SON") technology is proposed, attempting to implement automation as far as possible at planning, deployment, and operation and maintenance stages of a mobile communications network, so as adapt to network changes, and achieve an objective of reducing operation expenditure ("OPEX").

For network performance optimization based on the SON technology, a model-based technical solution or a model-free technical solution may be used. The model-based technical solution is more suitable for actual application, but requires a model used for the network performance optimization to be very accurate, and to be capable of adapting to a service change of a mobile user.

Services of mobile users are increasingly diverse and dynamic. Generally, the services of the mobile users may be divided into a guaranteed bit rate ("GBR") service and a non-GBR ("non-GBR") service according to service requirements. A priority of the non-GBR service is lower than that of the GBR service, and a rate requirement of the non-GBR service is also uncertain. Therefore, the non-GBR service is more dynamic, and is difficult to predict.

Therefore, a key performance indicator ("KPI") model that is usually used at present is based on load estimation, and the load estimation is based on a rate requirement of the GBR service, which causes the KPI model to be inaccurate. Therefore, a solution obtained during KPI optimization is not optimal, and performance of a communications network cannot be greatly improved.

SUMMARY

Embodiments of the present disclosure provide a method and an apparatus for determining a performance indicator of a communications network, which can improve accuracy of calculation of a network performance indicator, and can improve network performance.

According to a first aspect, a method for determining a performance indicator of a communications network is provided, where the method includes: acquiring bandwidth utilization rates of multiple areas included in a communications network, throughputs of guaranteed bit rate GBR services of the multiple areas, and throughputs of non-GBR services of the multiple areas; determining load statuses of the multiple areas according to the bandwidth utilization rates of the multiple areas; determining rate requirements of the non-GBR services of the multiple areas according to the load statuses of the multiple areas, the throughputs of the GBR services of the multiple areas, and the throughputs of the non-GBR services of the multiple areas; determining rate requirements of the GBR services of the multiple areas; determining loads of the multiple areas according to the rate requirements of the GBR services of the multiple areas and the rate requirements of the non-GBR services of the multiple areas; and determining a load-associated key performance indicator KPI of the communications network according to the loads of the multiple areas.

With reference to the first aspect, in a first possible implementation manner of the first aspect, the determining load statuses of the multiple areas includes: determining an average bandwidth utilization rate and an overload degree of each area in the multiple areas according to the bandwidth utilization rates of the multiple areas; and determining an overload status of each area in the multiple areas according to the average bandwidth utilization rate and the overload degree.

With reference to the first aspect or the first possible implementation manner of the first aspect, in a second possible implementation manner of the first aspect, the determining rate requirements of the non-GBR services of the multiple areas includes: determining service requirement ratios of non-overloaded areas in the multiple areas according to the throughputs of the GBR services of the multiple areas and the throughputs of the non-GBR services of the multiple areas, where the service requirement ratios represent ratios of the rate requirements of the non-GBR services to the rate requirements of the GBR services; determining service requirement ratios of overloaded areas in the multiple areas according to the service requirement ratios of the non-overloaded areas in the multiple areas; and determining a rate requirement of a non-GBR service of each area in the multiple areas according to the service requirement ratios of the non-overloaded areas in the multiple areas, the service requirement ratios of the overloaded areas in the multiple areas, the throughputs of the GBR services of the multiple areas, and the throughputs of the non-GBR services of the multiple areas.

With reference to the first aspect or the first possible implementation manner of the first aspect, in a third possible implementation manner of the first aspect, the communications network includes multiple cells, each cell includes one or more sub-areas, each sub-area includes one or more pixels, and when areas in the multiple areas are sub-areas, the determining rate requirements of the non-GBR services of the multiple areas includes: determining, according to throughputs of GBR services of pixels included in the multiple sub-areas and throughputs of non-GBR services of the pixels included in the multiple sub-areas, service requirement ratios of pixels included in non-overloaded sub-areas in the multiple sub-areas, where the service requirement ratios of the pixels represent ratios of rate requirements of the non-GBR services of the pixels to rate requirements of the GBR services of the pixels; determining, according to the service requirement ratios of the pixels included in the non-overloaded sub-areas, service requirement ratios of pixels included in overloaded sub-areas in the multiple sub-areas; determining, according to the service requirement ratios of the pixels included in the non-overloaded sub-areas, the service requirement ratios of the pixels included in the overloaded sub-areas, the throughputs of the GBR services of the pixels included in the multiple sub-areas, and the throughputs of the non-GBR services of the pixels included in the multiple sub-areas, rate requirements of the non-GBR services of the pixels included in the multiple sub-areas; and determining a sum of rate requirements of non-GBR services of pixels separately included in each sub-area as a rate requirement of a non-GBR service of each of the sub-areas.

With reference to the second possible implementation manner of the first aspect, in a fourth possible implementation manner of the first aspect, the determining a rate requirement of a non-GBR service of each area in the multiple areas includes: determining a rate requirement of a GBR service of each area in the multiple areas according to a throughput of the GBR service of each area in the multiple areas; determining an initial value of the rate requirement of the non-GBR service of each area in the multiple areas according to the service requirement ratios of the non-overloaded areas in the multiple areas, the service requirement ratios of the overloaded areas in the multiple areas, and the rate requirement of the GBR service of each area in the multiple areas; and determining the rate requirement of the non-GBR service of each area in the multiple areas according to a throughput of the non-GBR service of each area in the multiple areas and the initial value of the rate requirement of the non-GBR service of each area in the multiple areas.

With reference to any possible implementation manner in the second to the fourth possible implementation manners of the first aspect, in a fifth possible implementation manner of the first aspect, the determining rate requirements of the GBR services of the multiple areas includes: separately determining the throughput of the GBR service of each area in the multiple areas as the rate requirement of the GBR service of each of the areas.

With reference to the first aspect or any possible implementation manner in the first to the fifth possible implementation manners of the first aspect, in a sixth possible implementation manner of the first aspect, the determining loads of the multiple areas includes: determining an estimated load and a service load ratio of each area in the multiple areas according to the rate requirements of the GBR services of the multiple areas and the rate requirements of the non-GBR services of the multiple areas; and separately determining a GBR service load and a non-GBR service load of each of the areas in the multiple areas according to the estimated load and the service load ratio of each of the areas.

With reference to the sixth possible implementation manner of the first aspect, in a seventh possible implementation manner of the first aspect, the determining a load-associated key performance indicator KPI of the communications network includes: determining the load-associated key performance indicator KPI of the communications network according to GBR service loads and/or non-GBR service loads of the multiple areas, where the KPI includes at least one indicator of the following indicators: an average load of the communications network, an average signal-to-interference-plus-noise ratio SINR of the communications network, a call drop and block rate of the communications network, and a throughput of the communications network.

According to a second aspect, an apparatus for determining a performance indicator of a communications network is provided, where the apparatus includes: an acquiring module, configured to acquire bandwidth utilization rates of multiple areas included in a communications network, throughputs of guaranteed bit rate GBR services of the multiple areas, and throughputs of non-GBR services of the multiple areas; a first determining module, configured to determine load statuses of the multiple areas according to the bandwidth utilization rates of the multiple areas acquired by the acquiring module; a second determining module, configured to determine rate requirements of the non-GBR services of the multiple areas according to the load statuses of the multiple areas that are determined by the first determining module, and the throughputs of the GBR services of the multiple areas and the throughputs of the non-GBR services of the multiple areas that are acquired by the acquiring module; a third determining module, configured to determine rate requirements of the GBR services of the multiple areas; a fourth determining module, configured to determine loads of the multiple areas according to the rate requirements of the non-GBR services of the multiple areas that are determined by the second determining module and the rate requirements of the GBR services of the multiple areas that are determined by the third determining module; and a fifth determining module, configured to determine a load-associated key performance indicator KPI of the communications network according to the loads of the multiple areas that are determined by the fourth determining module.

With reference to the second aspect, in a first possible implementation manner of the second aspect, the first determining module includes: a first determining unit, configured to determine an average bandwidth utilization rate and an overload degree of each area in the multiple areas according to the bandwidth utilization rates of the multiple areas acquired by the acquiring module; and a second determining unit, configured to determine an overload status of each area in the multiple areas according to the average bandwidth utilization rate and the overload degree that are determined by the first determining unit.

With reference to the second aspect or the first possible implementation manner of the second aspect, in a second possible implementation manner of the second aspect, the second determining module includes: a third determining unit, configured to determine service requirement ratios of non-overloaded areas in the multiple areas according to the throughputs of the GBR services of the multiple areas and the throughputs of the non-GBR services of the multiple areas that are acquired by the acquiring module, where the service requirement ratios represent ratios of the rate requirements of the non-GBR services to the rate requirements of the GBR services; a fourth determining unit, configured to determine service requirement ratios of overloaded areas in the multiple areas according to the service requirement ratios of the non-overloaded areas in the multiple areas that are determined by the third determining unit; and a fifth determining unit, configured to determine a rate requirement of a non-GBR service of each area in the multiple areas according to the service requirement ratios of the non-overloaded areas in the multiple areas that are determined by third determining unit, the service requirement ratios of the overloaded areas in the multiple areas that are determined by the fourth determining unit, and the throughputs of the GBR services of the multiple areas and the throughputs of the non-GBR services of the multiple areas that are acquired by the acquiring module.

With reference to the second aspect or the first possible implementation manner of the second aspect, in a third possible implementation manner of the second aspect, the communications network includes multiple cells, each cell includes one or more sub-areas, each sub-area includes one or more pixels, and when areas in the multiple areas are sub-areas, the second determining module includes: a first determining submodule, configured to determine, according to throughputs of GBR services of pixels included in the multiple sub-areas and throughputs of non-GBR services of the pixels included in the multiple sub-areas, service requirement ratios of pixels included in non-overloaded sub-areas in the multiple sub-areas, where the service requirement ratios of the pixels represent ratios of rate requirements of the non-GBR services of the pixels to rate requirements of the GBR services of the pixels; a second determining submodule, configured to determine, according to the service requirement ratios of the pixels included in the non-overloaded sub-areas, service requirement ratios of pixels included in overloaded sub-areas in the multiple sub-areas; a third determining submodule, configured to determine, according to the service requirement ratios of the pixels included in the non-overloaded sub-areas, the service requirement ratios of the pixels included in the overloaded sub-areas, the throughputs of the GBR services of the pixels included in the multiple sub-areas, and the throughputs of the non-GBR services of the pixels included in the multiple sub-areas, rate requirements of the non-GBR services of the pixels included in the multiple sub-areas; and a fourth determining submodule, configured to determine a sum of rate requirements of non-GBR services of pixels separately included in each sub-area as a rate requirement of a non-GBR service of each of the sub-areas.

With reference to the second possible implementation manner of the second aspect, in a fourth possible implementation manner of the second aspect, the fifth determining unit includes: a first determining subunit, configured to determine a rate requirement of a GBR service of each area in the multiple areas according to a throughput of the GBR service of each area in the multiple areas; a second determining subunit, configured to determine an initial value of the rate requirement of the non-GBR service of each area in the multiple areas according to the service requirement ratios of the non-overloaded areas in the multiple areas, the service requirement ratios of the overloaded areas in the multiple areas, and the rate requirement of the GBR service of each area in the multiple areas; and a third determining subunit, configured to determine the rate requirement of the non-GBR service of each area in the multiple areas according to a throughput of the non-GBR service of each area in the multiple areas and the initial value of the rate requirement of the non-GBR service of each area in the multiple areas.

With reference to any possible implementation manner in the second to the fourth possible implementation manners of the second aspect, in a fifth possible implementation manner of the second aspect, the third determining module is configured to: separately determine the throughput of the GBR service of each area in the multiple areas as the rate requirement of the GBR service of each of the areas.

With reference to the second aspect or any possible implementation manner in the first to the fifth possible implementation manners of the second aspect, in a sixth possible implementation manner of the second aspect, the fourth determining module includes: a sixth determining unit, configured to determine an estimated load and a service load ratio of each area in the multiple areas according to the rate requirements of the non-GBR services of the multiple areas that are determined by the second determining module and the rate requirements of the GBR services of the multiple areas that are determined by the third determining module; and a seventh determining unit, configured to separately determine a GBR service load and a non-GBR service load of each of the areas in the multiple areas according to the estimated load and the service load ratio of each of the areas that are determined by the sixth determining unit.

With reference to the sixth possible implementation manner of the second aspect, in a seventh possible implementation manner of the second aspect, the fifth determining module is configured to: determine the load-associated key performance indicator KPI of the communications network according to GBR service loads and/or non-GBR service loads of the multiple areas that are determined by the fourth determining module, where the KPI includes at least one indicator of the following indicators: an average load of the communications network, an average signal-to-interference-plus-noise ratio SINR of the communications network, a call drop and block rate of the communications network, and a throughput of the communications network.

Based on the foregoing technical solutions, according to the method and the apparatus for determining a performance indicator of a communications network in the embodiments of the present disclosure, load statuses of areas are determined, and rate requirements of GBR services and rate requirements of non-GBR services of the areas are determined based on the load statuses, throughputs of the GBR services, and throughputs of the non-GBR services of the areas, so that loads can be accurately estimated, and accordingly, accuracy of calculation of a network performance indicator can be improved, and network performance can be improved.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 3 is a schematic flowchart of a method for determining a rate requirement of a service according to an embodiment of the present disclosure;

FIG. 4 is another schematic flowchart of a method for determining a rate requirement of a service according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the embodiments of the present disclosure may be applied to various communications systems, such as: a Global System of Mobile Communications ("GSM") system, a Code Division Multiple Access ("CDMA") system, a Wideband Code Division Multiple Access ("WCDMA") system, a general packet radio service ("GPRS"), a Long Term Evolution ("LTE") system, an LTE frequency division duplex ("FDD") system, an LTE time division duplex ("TDD"), a Universal Mobile Telecommunications System ("UMTS"), a Worldwide Interoperability for Microwave Access ("WiMAX") communications system or the like.

It should be further understood that, for ease of description, the following embodiments are described by using a self-organizing network SON as an example, but the embodiments of the present disclosure are not limited thereto.

Figure 1:
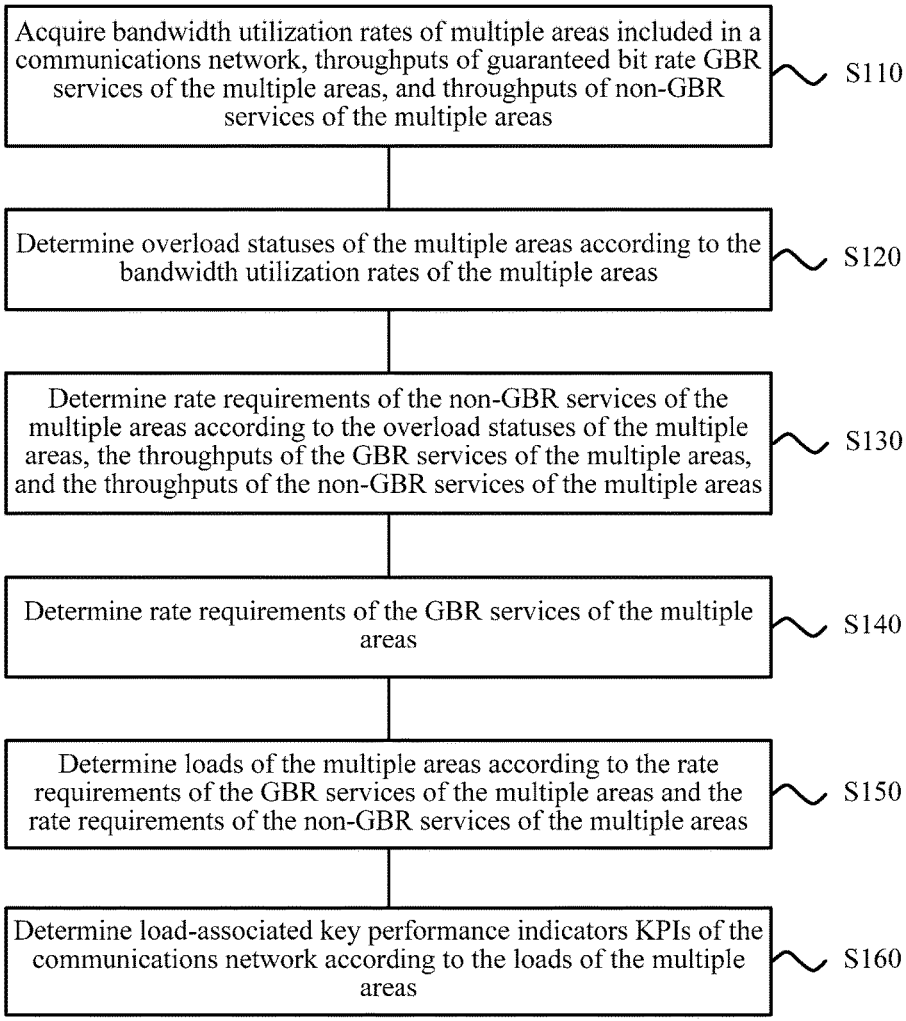
FIG. 1 is a schematic flowchart of a method for determining a performance indicator of a communications network according to an embodiment of the present disclosure.

FIG. 1 is a schematic flowchart of a method 100 for determining a performance indicator of a communications network according to an embodiment of the present disclosure. As shown in FIG. 1, the method 100 includes:

S110: Acquire bandwidth utilization rates of multiple areas included in a communications network, throughputs of guaranteed bit rate GBR services of the multiple areas, and throughputs of non-GBR services of the multiple areas.

S120: Determine load statuses of the multiple areas according to the bandwidth utilization rates of the multiple areas.

S130: Determine rate requirements of the non-GBR services of the multiple areas according to the load statuses of the multiple areas, the throughputs of the GBR services of the multiple areas, and the throughputs of the non-GBR services of the multiple areas.

S140: Determine rate requirements of the GBR services of the multiple areas.

S150: Determine loads of the multiple areas according to the rate requirements of the GBR services of the multiple areas and the rate requirements of the non-GBR services of the multiple areas.

S160: Determine a load-associated key performance indicator KPI of the communications network according to the loads of the multiple areas.

Usually, a change of a network environment is mainly a change of a service, and is particularly a dynamic change of a non-GBR service. In an existing technical solution, a rate requirement of a GBR service may be accurately obtained by using a service request message used when a user requests the GBR service. Therefore, statistics of rate requirements of GBR services are accurate. However, rate requirements of non-GBR services not only depend on distribution and changes of non-GBR service requirements of users, but also rely on distribution and changes of GBR services. Therefore, the rate requirements of the non-GBR services are caused to be uncertain. Therefore, in the existing technical solution, in KPI models, only the rate requirements of the GBR services are considered in load estimation, which leads to an inaccurate load estimation, and leads to inaccurate network performance indicators, and unobvious network optimization effects.

In this embodiment of the present disclosure, an apparatus for determining a performance indicator of a communications network may acquire, based on statistics, bandwidth utilization rates of areas, and throughputs of GBR services and throughputs of non-GBR services in the areas, and load statuses of the areas are determined first, so that the apparatus may determine rate requirements of the GBR services and rate requirements of the non-GBR services according to the load statuses of the areas, and may determine loads of the areas. Therefore, the apparatus for determining a performance indicator of a communications network may further determine a load-associated key performance indicator KPI of the communications network according to the loads of the areas.

Therefore, in the method for determining a performance indicator of a communications network in this embodiment of the present disclosure, load statuses of areas are determined, and rate requirements of GBR services and rate requirements of non-GBR services of the areas are determined based on the load statuses, throughputs of the GBR services, and throughputs of the non-GBR services of the areas, so that loads can be accurately estimated, and accordingly, accuracy of calculation of a network performance indicator can be improved, and network performance can be improved.

The method 100 for determining a performance indicator of a communications network according to this embodiment of the present disclosure is described in detail below with reference to FIG. 2 to FIG. 6.

Specifically, in S110, an apparatus for determining a performance indicator of a communications network may acquire bandwidth utilization rates of multiple areas included in a communications network, and a throughput of a GBR service of and a throughput of a non-GBR service of each area in the multiple areas.

For example, a base station or an SON entity included in a base station may collect statistics about the bandwidth utilization rates of the areas included in the communications network, and may collect statistics about throughputs of GBR services and throughputs of non-GBR services of the areas. The base station or the SON entity may send information acquired through statistics collection to the apparatus for determining a performance indicator of a communications network, so that the apparatus determines a KPI of the communications network.

In this embodiment of the present disclosure, the apparatus for determining a performance indicator of a communications network may be a controller in a communications system, or may be a management module or a coordinator ("eCoordinator") in a communications system, for example, the apparatus is an element management system ("EMS") or a network management system ("NMS"), or the like, but this embodiment of the present disclosure is not limited thereto.

In this embodiment of the present disclosure, acquiring bandwidth utilization rates and throughputs of GBR services or throughputs of non-GBR services of multiple areas not only may include acquiring a bandwidth utilization rate, a throughput of a GBR service or a throughput of a non-GBR service of the multiple areas as a whole, but also may include acquiring a bandwidth utilization rate and a throughput of a GBR service or a throughput of a non-GBR service of each area in the multiple areas, but the present disclosure is not limited thereto.

In this embodiment of the present disclosure, the communications network may include one or more cells, each cell may further include one or more sub-areas, each sub-area may further include one or more pixels, and each pixel may have a specific coverage area. In this embodiment of the present disclosure, the multiple areas included in the communications network may be multiple cells, or may be multiple sub-areas, or may be multiple pixels, but this embodiment of the present disclosure is not limited thereto. For example, the areas in this embodiment of the present disclosure may also be other areas that have coverage areas, and this embodiment of the present disclosure is not limited to specific division of cells, sub-areas, and pixels.

In S120, the apparatus for determining a performance indicator of a communications network may determine an overload status of each area in the multiple areas according to the bandwidth utilization rates of the multiple areas.

Figure 2:
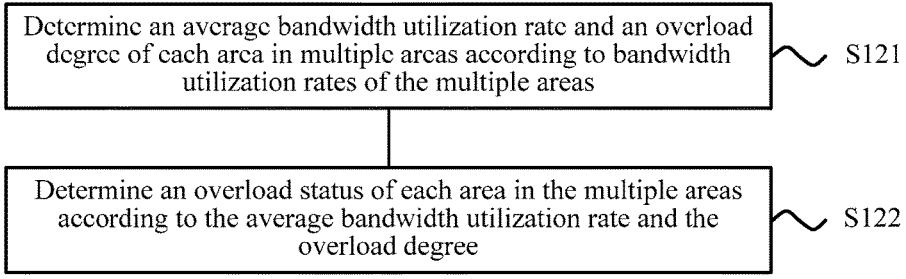
FIG. 2 is a schematic flowchart of a method for determining an overload status of an area according to an embodiment of the present disclosure.

Optionally, in this embodiment of the present disclosure, as shown in FIG. 2, the determining load statuses of the multiple areas includes:

S121: Determine an average bandwidth utilization rate and an overload degree of each area in the multiple areas according to the bandwidth utilization rates of the multiple areas.

S122: Determine an overload status of each area in the multiple areas according to the average bandwidth utilization rate and the overload degree.

Specifically, in S122, for a specific area in the multiple areas, an overload status of the specific area may be determined by separately comparing an average bandwidth utilization rate of the specific area with a first threshold and comparing an overload degree of the specific area with a second threshold, where the overload status includes an overloaded state and a non-overloaded state. For example, when the average bandwidth utilization rate of the specific area is greater than or equal to the first threshold, and the overload degree of the specific area is greater than or equal to the second threshold, it may be determined that the specific area is overloaded; otherwise, it may be determined that the specific area is not overloaded.

For example, for a specific area r in the multiple areas, based on a bandwidth utilization rate, obtained though periodic statistics collection, of the specific area r, an overload degree $OT_r$ of the specific area r may be determined by using the following equation (1), and an average bandwidth utilization rate $\rho_r^{avg}$ of the specific area r may be determined by using the following equation (2):

$$OT_r = T/(t_1 - t_0 + 1) \quad (1) \text{ and}$$

$$\rho_r^{avg} = \Sigma_{t=t_0:t_1} \rho_r(t)/(t_1 - t_0 + 1) \quad (2),$$

where T is a quantity of scheduling periods in which the bandwidth utilization rate $\rho_r(t)$ of the specific area r is 1 within a statistics collection time period from a scheduling period whose sequence number is to $t_0$ a scheduling period whose sequence number is $t_1$.

For example, when the average bandwidth utilization rate $\rho_r^{avg}$ of the specific area r is greater than a first threshold 0.9, and when the overload degree $OT_r$ of the specific area r is greater than a second threshold 12.5%, it may be considered that an overload status of the specific area r is an overloaded state, and the specific area r may be referred to as an overloaded area.

In this embodiment of the present disclosure, description is given by using only an example in which an overload degree and an average bandwidth utilization rate of an area are respectively determined by using the foregoing equations (1) and (2), but this embodiment of the present disclosure is not limited thereto, and the overload degree and the average bandwidth utilization rate of the area may also be determined based on other equations or relational expressions. In addition, in this embodiment of the present disclosure, description is given by using only an example in which the first threshold is 0.9 and the second threshold is 12.5%, but this embodiment of the present disclosure is not limited thereto.

In this embodiment of the present disclosure, the method shown in FIG. 2 for determining an overload status of an area is merely an exemplary embodiment of the present disclosure. In the present disclosure, another parameter related to a bandwidth utilization rate may also be determined according to a bandwidth utilization rate of an area, and an overload status of the area is determined thereby, but this embodiment of the present disclosure is not limited thereto.

In S130, the apparatus for determining a performance indicator of a communications network may determine a rate requirement of the non-GBR service of each area in the multiple areas according to load statuses of the multiple areas, and throughputs of GBR services and throughputs of non-GBR services of the multiple areas.

In this embodiment of the present disclosure, optionally, as shown in FIG. 3, the determining rate requirements of the non-GBR services of the multiple areas includes:

S131: Determine service requirement ratios of non-overloaded areas in the multiple areas according to the throughputs of the GBR services of the multiple areas and the throughputs of the non-GBR services of the multiple areas, where the service requirement ratios represent ratios of the rate requirements of the non-GBR services to the rate requirements of the GBR services.

S132: Determine service requirement ratios of overloaded areas in the multiple areas according to the service requirement ratios of the non-overloaded areas in the multiple areas.

S133: Determine a rate requirement of a non-GBR service of each area in the multiple areas according to the service requirement ratios of the non-overloaded areas in the multiple areas, the service requirement ratios of the overloaded areas in the multiple areas, the throughputs of the GBR services of the multiple areas, and the throughputs of the non-GBR services of the multiple areas.

That is, in this embodiment of the present disclosure, a service requirement ratio of a non-overloaded area represents a ratio of a rate requirement of a non-GBR service of the non-overloaded area to a rate requirement of a GBR service of the non-overloaded area; and a service requirement ratio of an overloaded area represents a ratio of a rate requirement of a non-GBR service of the overloaded area to a rate requirement of a GBR service of the overloaded area, but the present disclosure is not limited thereto.

Specifically, in S131, a ratio of an average throughput of a non-GBR service of a non-overloaded area p within the statistics collection time period to a rate requirement of a GBR service of the non-overloaded area p may be determined as a service requirement ratio of the non-overloaded area p, where a throughput of the GBR service of the non-overloaded area p may be determined as the rate requirement of the GBR service of the non-overloaded area p.

For example, the service requirement ratio TR(p) of the non-overloaded area p may be determined by using the following equations (3) and (4):

$$TR(p) = \frac{THP_{p,nGBR}^{avg}}{D_{p,GBR}} \quad (3)$$

and $$THP_{p,nGBR}^{avg} = \frac{\sum_{t=t_0:\ t_1} THP_{p,nGBR}(t)}{t_1 - t_0 + 1}, \quad (4)$$

where $THP_{p,nGBR}^{avg}$ is the average throughput of the non-GBR service of the non-overloaded area p within the statistics collection time period; $THP_{p,nGBR}(t)$ is a throughput of the non-GBR service of the non-overloaded area p in a scheduling period t; and $D_{p,GBR}$ is the rate requirement of the GBR service of the non-overloaded area p within the statistics collection time period.

In S132, the apparatus may perform weighted averaging on service requirement ratios of non-overloaded areas, to obtain service requirement ratios of overloaded areas.

For example, a service requirement ratio TR(q) of an overloaded area q may be determined by using the following equation (5):

$$TR(q) = (\Sigma_{p \in P} TR(p) K(p,q))/(\Sigma_{p \in P} K(p,q)) \quad (5),$$

where P is a set of non-overloaded areas in multiple areas; and K( ) is a Kernel function. A value of the Kernel function may be a Euclidean distance norm, or a reciprocal of a Manhattan (Manhattan) norm, or a Gaussian norm, but this embodiment of the present disclosure is not limited thereto.

Figure 5:
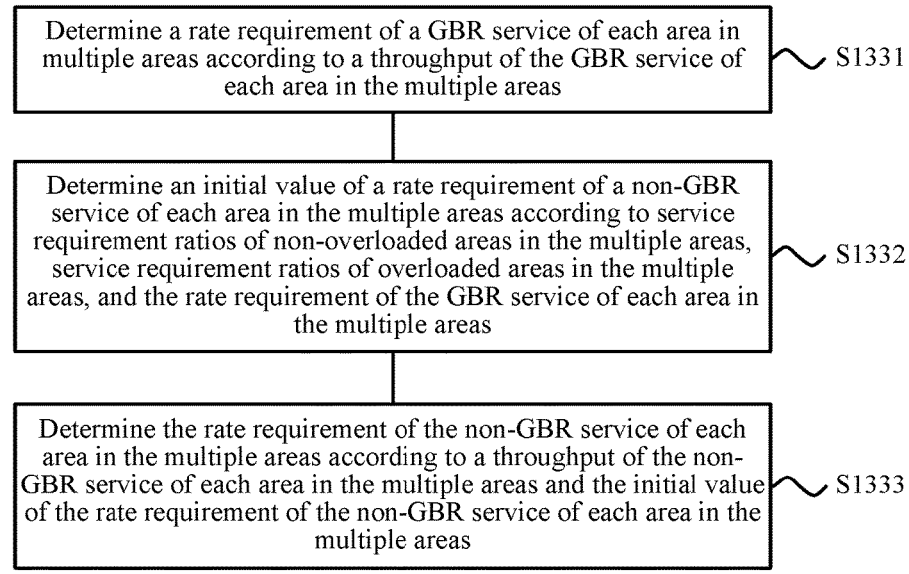
FIG. 5 is still another schematic flowchart of a method for determining a rate requirement of a service according to an embodiment of the present disclosure.

In S133, as shown in FIG. 5, optionally, the determining a rate requirement of a non-GBR service of each area in the multiple areas includes:

S1331: Determine a rate requirement of a GBR service of each area in the multiple areas according to a throughput of the GBR service of each area in the multiple areas.

S1332: Determine an initial value of the rate requirement of the non-GBR service of each area in the multiple areas according to the service requirement ratios of the non-overloaded areas in the multiple areas, the service requirement ratios of the overloaded areas in the multiple areas, and the rate requirement of the GBR service of each area in the multiple areas.

S1333: Determine the rate requirement of the non-GBR service of each area in the multiple areas according to a throughput of the non-GBR service of each area in the multiple areas and the initial value of the rate requirement of the non-GBR service of each area in the multiple areas.

Specifically, the apparatus may separately determine the throughput of the GBR service of each area in the multiple areas as the rate requirement of the GBR service of each area; and may determine a product of a service requirement ratio of an overloaded area q and a rate requirement of a GBR service of the overloaded area q as an initial value of a rate requirement of a non-GBR service of the overloaded area q in the multiple areas, and determine a product of a service requirement ratio of a non-overloaded area p and a rate requirement of a GBR service of the non-overloaded area p as an initial value of a rate requirement of a non-GBR service of the non-overloaded area p in the multiple areas, so that the apparatus may determine a rate requirement of a non-GBR service of an area from a throughput of a non-GBR service and an initial value of a rate requirement of the non-GBR service, for example, a larger one of a throughput of a non-GBR service and an initial value of a rate requirement of the non-GBR service in a area r is determined as the rate requirement of the non-GBR service of the area r.

For example, the rate requirement $D_{p,nGBR}$ of the non-GBR service of the overloaded area q and the rate requirement $D_{q,nGBR}$ of the non-GBR service of the non-overloaded area p in the multiple areas may be respectively determined by using the following equations (6) and (7):

$$D_{p,nGBR} = \max(THP_{p,nGBR}^{avg}, TR(p)D_{p,GBR}) \quad (6) \text{ and}$$

$$D_{q,nGBR} = \max(THP_{q,nGBR}^{avg}, TR(q)D_{q,GBR}) \quad (7),$$

where $THP_{q,nGBR}^{avg}$ is an average throughput of the non-GBR service of the overloaded area q within the statistics collection time period; and $D_{q,GBR}$ is the rate requirement of the GBR service of the overloaded area q within the statistics collection time period.

In S133, the rate requirement of the non-GBR service of each area in the multiple areas may also be determined according to the service requirement ratios of the non-overloaded areas in the multiple areas, the service requirement ratios of the overloaded areas in the multiple areas, and the throughputs of the GBR services of the multiple areas. For example, the apparatus may directly determine the initial value of the rate requirement of the non-GBR service as the rate requirement of the non-GBR service of the area, but this embodiment of the present disclosure is not limited thereto. In this embodiment of the present disclosure, the rate requirement of the non-GBR service of each area may also be determined by using another method.

In S1331, the rate requirement of the GBR service of each area in the multiple areas may also be determined according to another parameter or method, and the present disclosure is not limited thereto.

In this embodiment of the present disclosure, optionally, the communications network includes multiple cells, each cell includes one or more sub-areas, each sub-area includes one or more pixels, and when areas in the multiple areas are sub-areas, as shown in FIG. 4, determining rate requirements of the non-GBR services of the multiple areas includes:

S134: Determine, according to throughputs of GBR services of pixels included in the multiple sub-areas and throughputs of non-GBR services of the pixels included in the multiple sub-areas, service requirement ratios of pixels included in non-overloaded sub-areas in the multiple sub-areas, where the service requirement ratios of the pixels represent ratios of rate requirements of the non-GBR services of the pixels to rate requirements of the GBR services of the pixels.

S135: Determine, according to the service requirement ratios of the pixels included in the non-overloaded sub-areas, service requirement ratios of pixels included in overloaded sub-areas in the multiple sub-areas.

S136: Determine, according to the service requirement ratios of the pixels included in the non-overloaded sub-areas, the service requirement ratios of the pixels included in the overloaded sub-areas, the throughputs of the GBR services of the pixels included in the multiple sub-areas, and the throughputs of the non-GBR services of the pixels included in the multiple sub-areas, rate requirements of the non-GBR services of the pixels included in the multiple sub-areas.

S137: Determine a sum of rate requirements of non-GBR services of pixels separately included in each sub-area in the multiple sub-areas as a rate requirement of a non-GBR service of each of the sub-areas.

That is, in this embodiment of the present disclosure, a service requirement ratio of a pixel included in a non-overloaded sub-area represents a ratio of a rate requirement of a non-GBR service of the pixel included in the non-overloaded sub-area to a rate requirement of a GBR service of the pixel included in the non-overloaded sub-area; and a service requirement ratio of a pixel included in an overloaded sub-area represents a ratio of a rate requirement of a non-GBR service of the pixel included in the overloaded sub-area to a rate requirement of a GBR service of the pixel included in the overloaded sub-area, but the present disclosure is not limited thereto.

Optionally, the determining rate requirements of the non-GBR services of the pixels included in the multiple sub-areas includes:

determining, according to the throughputs of the GBR services of the pixels included in the multiple sub-areas, rate requirements of the GBR services of the pixels included in the multiple sub-areas;

determining, according to the service requirement ratios of the pixels included in the non-overloaded sub-areas in the multiple sub-areas, the service requirement ratios of the pixels included in the overloaded sub-areas in the multiple sub-areas, and the rate requirements of the GBR services of the pixels included in the multiple sub-areas, initial values of the rate requirements of the non-GBR services of the pixels included in the multiple sub-areas; and determining, according to the throughputs of the non-GBR services of the pixels included in the multiple sub-areas, and the initial values of the rate requirements of the non-GBR services of the pixels included in the multiple sub-areas, the rate requirements of the non-GBR services of the pixels included in the multiple sub-areas.

In this embodiment of the present disclosure, optionally, determining rate requirements of the GBR services of the multiple areas includes:

separately determining the throughput of the GBR service of each area in the multiple areas as the rate requirement of the GBR service of each of the areas; or separately determining a throughput of a GBR service of each pixel included in the multiple areas as a rate requirement of a GBR service of each pixel.

In S140, the apparatus for determining a performance indicator of a communications network may determine the rate requirements of the GBR services of the multiple areas according to multiple methods.

Optionally, in this embodiment of the present disclosure, the determining rate requirements of the GBR services of the multiple areas includes:

separately determining the throughput of the GBR service of each area in the multiple areas as the rate requirement of the GBR service of each of the areas.

In this embodiment of the present disclosure, the rate requirement of the GBR service or the non-GBR service of each area or each pixel may be determined by using another method, and this embodiment of the present disclosure is not limited thereto. For example, the apparatus may directly determine the initial values of the rate requirements of the non-GBR services of the pixels included in the multiple sub-areas as the rate requirements of the non-GBR services of the pixels included in the multiple sub-areas, but this embodiment of the present disclosure is not limited thereto. In this embodiment of the present disclosure, the rate requirement of the non-GBR service of each sub-area or each pixel may also be determined by using another method.

In S150, the apparatus for determining a performance indicator of a communications network may determine loads of the multiple areas according to the rate requirements of the GBR services of the multiple areas and the rate requirements of the non-GBR services of the multiple areas.

Figure 6:
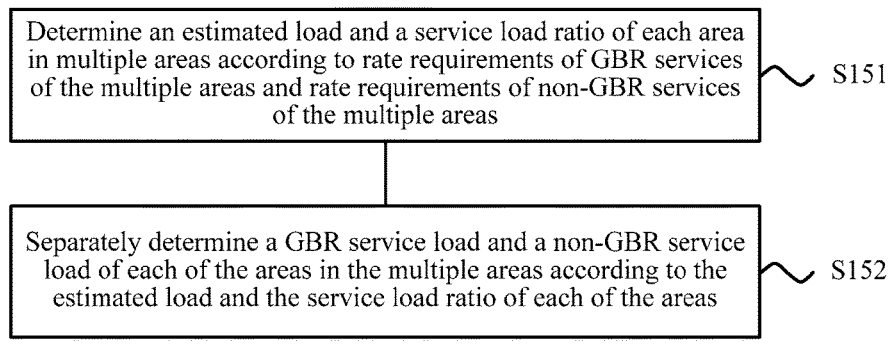
FIG. 6 is a schematic flowchart of a method for determining a load of an area according to an embodiment of the present disclosure.

In this embodiment of the present disclosure, optionally, as shown in FIG. 6, the determining loads of the multiple areas includes:

S151: Determine an estimated load and a service load ratio of each area in the multiple areas according to the rate requirements of the GBR services of the multiple areas and the rate requirements of the non-GBR services of the multiple areas.

S152: Separately determine a GBR service load and a non-GBR service load of each of the areas in the multiple areas according to the estimated load and the service load ratio of each of the areas.

For example, the apparatus may determine, based on rate requirements of a GBR service and a non-GBR service, a total estimated load, so that the apparatus may determine an estimated load of the GBR service or an estimated load of the non-GBR service, and a service load ratio according to the total estimated load. Accordingly, the apparatus may separately determine the GBR service load and the non-GBR service load of each of the areas in the multiple areas according to the estimated load and the service load ratio of each of the areas.

Description is made below by using as an example in which the communications network includes multiple cells, each cell includes one or more sub-areas, each sub-area includes one or more pixels, and areas in the multiple areas are sub-areas, but it should be understood that this embodiment of the present disclosure is not limited thereto.

For example, after the apparatus obtains a rate requirement of a non-GBR service, a total service rate requirement of a system may be a sum of rate requirements of the non-GBR service and a GBR service, so that a total estimated load $$\rho_{c,r}^{o}$$

of a sub-area r of a cell c may be obtained according to the following equation (8):

$$\tilde{p}_{c,r} \leq \frac{G_{c,r}}{W_{c,r}} f\left(\frac{N_{c,r}}{G_{c,r}} + \sum_{d \in I_c} \frac{H_{r,r'} \min(\tilde{p}_{d,r'}, 1)}{G_{c,r}}\right), \quad (8)$$

where $W_{c,r}$ is a bandwidth of the sub-area r of the cell c; a function $$f(x) = \frac{\log(2)}{\ln(1 + 1/x)};$$

$G_{c,r}$ is a service requirement coefficient; $N_{c,r}$ is a noise coefficient; $H_{r,r'}$ is an interference coefficient; a sub-area r' is a sub-area of a cell d neighboring to the cell c; Ic is a set of cells neighboring to the cell c; and $\tilde{\rho}_{d,r'}$ represents an estimated load of the sub-area r' of the cell d. $G_{c,r}$, $N_{c,r}$, and $H_{r,r'}$ may be separately determined according to the following equations (9) to (11):

$$G_{c,r} = \sum_{s \in S} \sum_{p \in r} \frac{T_{s,p} D_{s,p}}{k_r^{sch} \eta^{BW}} \quad (9)$$

$$N_{c,r} = \sum_{s \in S} \sum_{p \in r} \frac{T_{s,p} \eta^{SINR} D_{s,p} P^n}{k_r^{sch} \eta^{BW} P_{c,r} g_{r,p}} \text{ and} \quad (10)$$

$$H_{r,r'} = \sum_{s \in S} \sum_{p \in r} \sum_{r' \in d} \frac{T_{s,p} \eta^{SINR} D_{s,p} P_{d,r'} g_{r',p}}{k_r^{sch} \eta^{BW} P_{c,r} g_{r,p}}, \quad (11)$$

where S is a set of services s; p is a pixel included in the sub-area r; $D_{s,p}$ is a data rate required by a service s of the pixel p; $T_{s,p}$ is a quantity of active users of the service s of the pixel p; $T_{s,p} D_{s,p}$ represents a traffic volume of the service s of the pixel p; $P_{c,r}$ and $P_{d,r'}$ are respectively transmit powers of the sub-areas r and r'; $g_{r,p}$ and $g_{r',p}$ are respectively gains of channels from base stations to which the sub-areas r and r' belong, to the pixel p; $P^n$ represents a noise power; and $k_r^{sch}$, $\eta^{BW}$ and $\eta^{SINR}$ are constants.

Accordingly, an estimated load $$\overset{o}{\rho}_{c,r}^{GBR}$$

of a GBR service of the cell c may be determined by using the following equations (12) and (13):

$$\overset{o}{\rho}_{c,r}^{GBR} = t_{c,r} \overset{o}{\rho}_{c,r} \text{ and} \quad (12)$$

$$t_{c,r} = \left(\sum_{p \in c,r} D_{p,GBR}\right) / \sum_{p \in c,r} (D_{p,GBR} + D_{p,nGBR}), \quad (13)$$

where $t_{c,r}$ is a rate requirement coefficient; $D_{p,GBR}$ is a rate requirement of a GBR service of the pixel p within the statistics collection time period; and $D_{p,nGBR}$ is a rate requirement of a non-GBR service of the pixel p within the statistics collection time period.

Therefore, an actual load $\rho_{c,r}^{GBR}$ of the GBR service and an actual load $\rho_{c,r}^{nGBR}$ of a non-GBR service of the cell c may be respectively determined by using the following equations (14) and (15):

$$\rho_{c,r}^{GBR} = \min\left(c_{eff} \overset{o}{\rho}_{c,r}^{GBR}, 1\right) \text{ and} \quad (14)$$

$$\rho_{c,r}^{nGBR} = \min\left(c_{eff} \overset{o}{\rho}_{c,r}, 1\right) - \min\left(c_{eff} \overset{o}{\rho}_{c,r}^{GBR}, 1\right), \quad (15)$$

where $$\overset{o}{\rho}_{c,r}$$

is the total estimated load;

$$\overset{o}{\rho}_{c,r}^{GBR}$$

is the estimated load of the GBR service of the cell c; and $c_{eff}$ is a service load ratio, where $c_{eff}$ may be determined by using the following equation (16):

$$c_{eff} = \rho_{c,r}^{avg} / \overset{o}{\rho}_{c,r}, \quad (16)$$

where $\rho_{c,r}^{avg}$ is an average bandwidth utilization rate of the sub-area r of the cell c within the statistics collection time period.

It should be understood that, this embodiment of the present disclosure is described by using the foregoing equations as examples only, but the present disclosure is not limited thereto.

In S160, the apparatus may determine a load-associated key performance indicator KPI of the communications network according to the loads of the multiple areas.

Optionally, in this embodiment of the present disclosure, the determining a load-associated key performance indicator KPI of the communications network includes:

determining the load-associated key performance indicator KPI of the communications network according to GBR service loads and/or non-GBR service loads of the multiple areas, where the KPI includes at least one indicator of the following indicators: an average load of the communications network, an average signal-to-interference-plus-noise ratio SINR of the communications network, a call drop and block rate of the communications network, and a throughput of the communications network.

Other load-associated KPIs may also be determined according to GBR service loads and non-GBR service loads of multiple areas, multiple pixels, or multiple sub-areas, but this embodiment of the present disclosure is not limited thereto.

It should be understood that, this embodiment of the present disclosure is described by using an example of determining a related parameter of each area in the multiple areas, but this embodiment of the present disclosure is not limited thereto. For example, in this embodiment of the present disclosure, an overload status, a rate requirement of a non-GBR service, a rate requirement of a GBR service, a load, or the like of an area set including at least one area may also be determined, so as to determine the load-associated key performance indicator KPI of the communications network.

It should be further understood that sequence numbers of the foregoing processes do not mean execution sequences in various embodiments of the present disclosure. The execution sequences of the processes should be determined according to functions and internal logic of the processes, and should not be construed as any limitation to the implementation processes of the embodiments of the present disclosure.

Therefore, in the method for determining a performance indicator of a communications network in this embodiment of the present disclosure, load statuses of areas are determined, and rate requirements of GBR services and rate requirements of non-GBR services of the areas are determined based on the load statuses, throughputs of the GBR services, and throughputs of the non-GBR services of the areas, so that loads can be accurately estimated, and accordingly, accuracy of calculation of a network performance indicator can be improved, and network performance can be improved.

A method for determining a performance indicator of a communications network according to an embodiment of the present disclosure is described in detail above with reference to FIG. 1 to FIG. 6. An apparatus for determining a performance indicator of a communications network according to an embodiment of the present disclosure is described in detail below with reference to FIG. 7 to FIG. 13.

Figure 7:
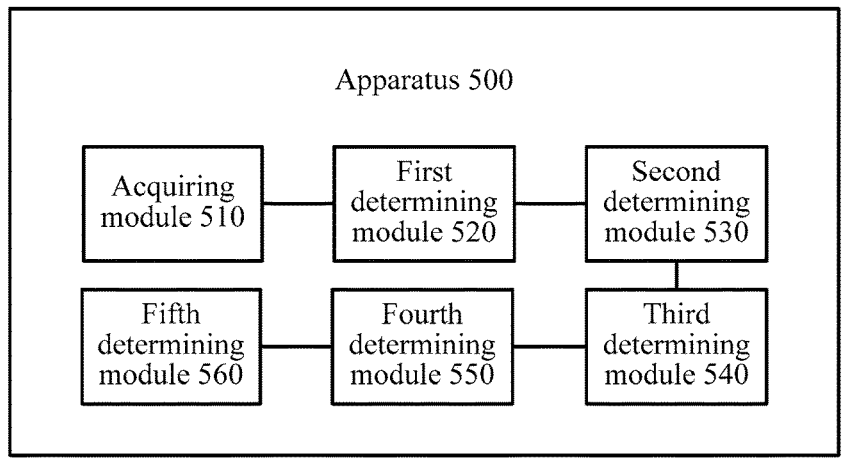
FIG. 7 is a schematic block diagram of an apparatus for determining a performance indicator of a communications network according to an embodiment of the present disclosure.

FIG. 7 is a schematic block diagram of an apparatus 500 for determining a performance indicator of a communications network according to an embodiment of the present disclosure. As shown in FIG. 7, the apparatus 500 includes:

an acquiring module 510, configured to acquire bandwidth utilization rates of multiple areas included in a communications network, throughputs of guaranteed bit rate GBR services of the multiple areas, and throughputs of non-GBR services of the multiple areas;

a first determining module 520, configured to determine load statuses of the multiple areas according to the bandwidth utilization rates of the multiple areas acquired by the acquiring module 510;

a second determining module 530, configured to determine rate requirements of the non-GBR services of the multiple areas according to the load statuses of the multiple areas that are determined by the first determining module 520, and the throughputs of the GBR services of the multiple areas and the throughputs of the non-GBR services of the multiple areas that are acquired by the acquiring module 510;

a third determining module 540, configured to determine rate requirements of the GBR services of the multiple areas;

a fourth determining module 550, configured to determine loads of the multiple areas according to the rate requirements of the non-GBR services of the multiple areas that are determined by the second determining module 530 and the rate requirements of the GBR services of the multiple areas that are determined by the third determining module 540; and a fifth determining module 560, configured to determine a load-associated key performance indicator KPI of the communications network according to the loads of the multiple areas that are determined by the fourth determining module 550.

Therefore, with the apparatus for determining a performance indicator of a communications network in this embodiment of the present disclosure, load statuses of areas are determined, and rate requirements of GBR services and rate requirements of non-GBR services of the areas are determined based on the load statuses, throughputs of the GBR services, and throughputs of the non-GBR services of the areas, so that loads can be accurately estimated, and accordingly, accuracy of calculation of a network performance indicator can be improved, and network performance can be improved.

Figure 8:
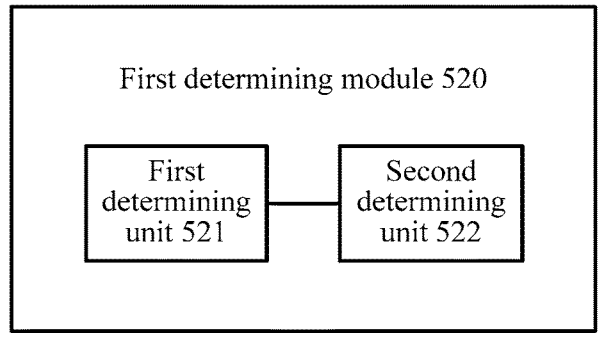
FIG. 8 is a schematic block diagram of a first determining module according to an embodiment of the present disclosure.

In this embodiment of the present disclosure, optionally, as shown in FIG. 8, the first determining module 520 includes:

a first determining unit 521, configured to determine an average bandwidth utilization rate and an overload degree of each area in the multiple areas according to the bandwidth utilization rates of the multiple areas acquired by the acquiring module 510; and a second determining unit 522, configured to determine an overload status of each area in the multiple areas according to the average bandwidth utilization rate and the overload degree that are determined by the first determining unit 521.

Figure 9:
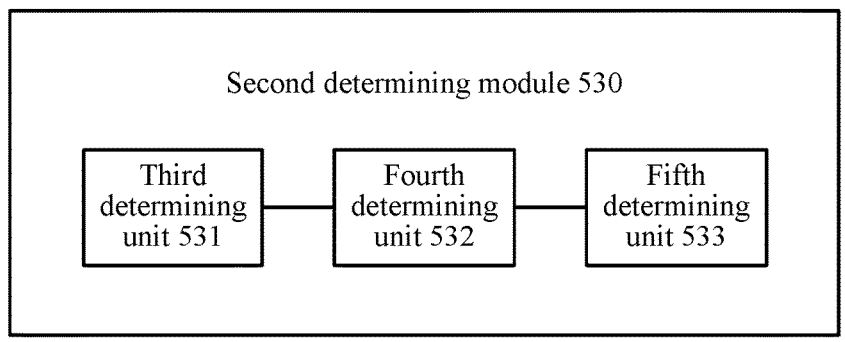
FIG. 9 is a schematic block diagram of a second determining module according to an embodiment of the present disclosure.

In this embodiment of the present disclosure, optionally, as shown in FIG. 9, the second determining module 530 includes:

a third determining unit 531, configured to determine service requirement ratios of non-overloaded areas in the multiple areas according to the throughputs of the GBR services of the multiple areas and the throughputs of the non-GBR services of the multiple areas that are acquired by the acquiring module 510, where the service requirement ratios represent ratios of the rate requirements of the non-GBR services to the rate requirements of the GBR services;

a fourth determining unit 532, configured to determine service requirement ratios of overloaded areas in the multiple areas according to the service requirement ratios of the non-overloaded areas in the multiple areas that are determined by the third determining unit 531; and a fifth determining unit 533, configured to determine a rate requirement of a non-GBR service of each area in the multiple areas according to the service requirement ratios of the non-overloaded areas in the multiple areas that are determined by third determining unit 531, the service requirement ratios of the overloaded areas in the multiple areas that are determined by the fourth determining unit 532, and the throughputs of the GBR services of the multiple areas and the throughputs of the non-GBR services of the multiple areas that are acquired by the acquiring module 510.

Figure 10:
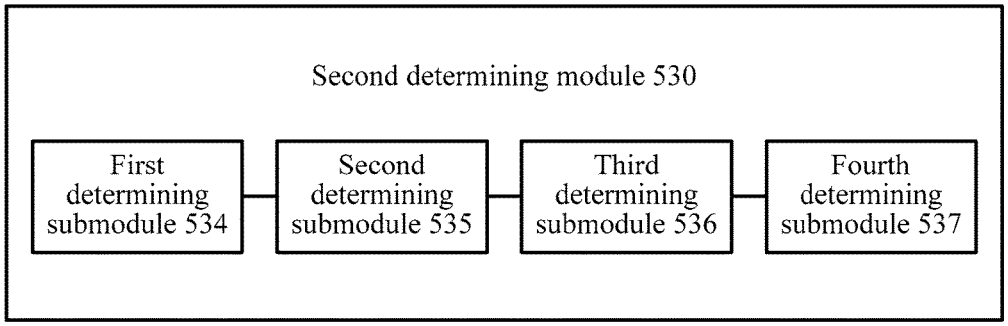
FIG. 10 is another schematic block diagram of the second determining module according to an embodiment of the present disclosure.

Optionally, in this embodiment of the present disclosure, as shown in FIG. 10, the communications network includes multiple cells, each cell includes one or more sub-areas, each sub-area includes one or more pixels, and when areas in the multiple areas are sub-areas, the second determining module 530 includes:

a first determining submodule 534, configured to determine, according to throughputs of GBR services of pixels included in the multiple sub-areas and throughputs of non-GBR services of the pixels included in the multiple sub-areas, service requirement ratios of pixels included in non-overloaded sub-areas in the multiple sub-areas, where the service requirement ratios of the pixels represent ratios of rate requirements of the non-GBR services of the pixels to rate requirements of the GBR services of the pixels;

a second determining submodule 535, configured to determine, according to the service requirement ratios of the pixels included in the non-overloaded sub-areas, service requirement ratios of pixels included in overloaded sub-areas in the multiple sub-areas;

a third determining submodule 536, configured to determine, according to the service requirement ratios of the pixels included in the non-overloaded sub-areas, the service requirement ratios of the pixels included in the overloaded sub-areas, the throughputs of the GBR services of the pixels included in the multiple sub-areas, and the throughputs of the non-GBR services of the pixels included in the multiple sub-areas, rate requirements of the non-GBR services of the pixels included in the multiple sub-areas; and a fourth determining submodule 537, configured to determine a sum of rate requirements of non-GBR services of pixels separately included in each sub-area as a rate requirement of a non-GBR service of each of the sub-areas.

Figure 11:
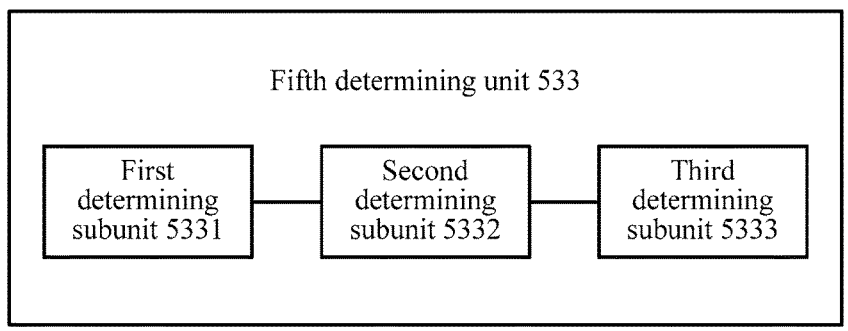
FIG. 11 is a schematic block diagram of a fifth determining unit according to an embodiment of the present disclosure.

In this embodiment of the present disclosure, optionally, as shown in FIG. 11, the fifth determining unit 533 includes:

a first determining subunit 5331, configured to determine a rate requirement of a GBR service of each area in the multiple areas according to a throughput of the GBR service of each area in the multiple areas;

a second determining subunit 5332, configured to determine an initial value of the rate requirement of the non-GBR service of each area in the multiple areas according to the service requirement ratios of the non-overloaded areas in the multiple areas, the service requirement ratios of the overloaded areas in the multiple areas, and the rate requirement of the GBR service of each area in the multiple areas; and a third determining subunit 5333, configured to determine the rate requirement of the non-GBR service of each area in the multiple areas according to a throughput of the non-GBR service of each area in the multiple areas and the initial value of the rate requirement of the non-GBR service of each area in the multiple areas.

Optionally, in this embodiment of the present disclosure, the third determining module 540 is configured to:

separately determine the throughput of the GBR service of each area in the multiple areas as the rate requirement of the GBR service of each of the areas.

Figure 12:
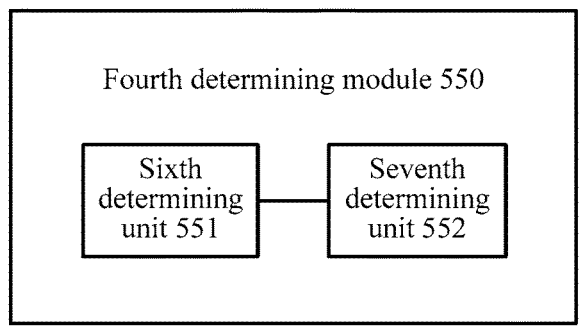
FIG. 12 is a schematic block diagram of a fourth determining module according to an embodiment of the present disclosure.

In this embodiment of the present disclosure, optionally, as shown in FIG. 12, the fourth determining module 550 includes:

a sixth determining unit 551, configured to determine an estimated load and a service load ratio of each area in the multiple areas according to the rate requirements of the non-GBR services of the multiple areas that are determined by the second determining module 530 and the rate requirements of the GBR services of the multiple areas that are determined by the third determining module 540; and a seventh determining unit 552, configured to separately determine a GBR service load and a non-GBR service load of each of the areas in the multiple areas according to the estimated load and the service load ratio of each of the areas that are determined by the sixth determining unit 551.

In this embodiment of the present disclosure, optionally, the fifth determining module 560 is configured to:

determine the load-associated key performance indicator KPI of the communications network according to GBR service loads and/or non-GBR service loads of the multiple areas that are determined by the fourth determining module, where the KPI includes at least one indicator of the following indicators: an average load of the communications network, an average signal-to-interference-plus-noise ratio SINR of the communications network, a call drop and block rate of the communications network, and a throughput of the communications network.

The apparatus 500 for determining a performance indicator of a communications network according to this embodiment of the present disclosure may correspond to an entity executing methods in the foregoing embodiments of the present disclosure, and the foregoing and other operations and/or functions of modules in the apparatus 500 are separately used to implement corresponding procedures of the methods in FIG. 1 to FIG. 6. For brevity, details are not described herein again.

Therefore, with the apparatus for determining a performance indicator of a communications network in this embodiment of the present disclosure, load statuses of areas are determined, and rate requirements of GBR services and rate requirements of non-GBR services of the areas are determined based on the load statuses, throughputs of the GBR services, and throughputs of the non-GBR services of the areas, so that loads can be accurately estimated, and accordingly, accuracy of calculation of a network performance indicator can be improved, and network performance can be improved.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of the present disclosure, "B corresponding to A" indicates that B is associated with A, and B may be determined according to A. It should be further understood that, the determining B according to A does not mean that B is determined according to only A, and B may also be determined according to A and/or other information.

Figure 13:
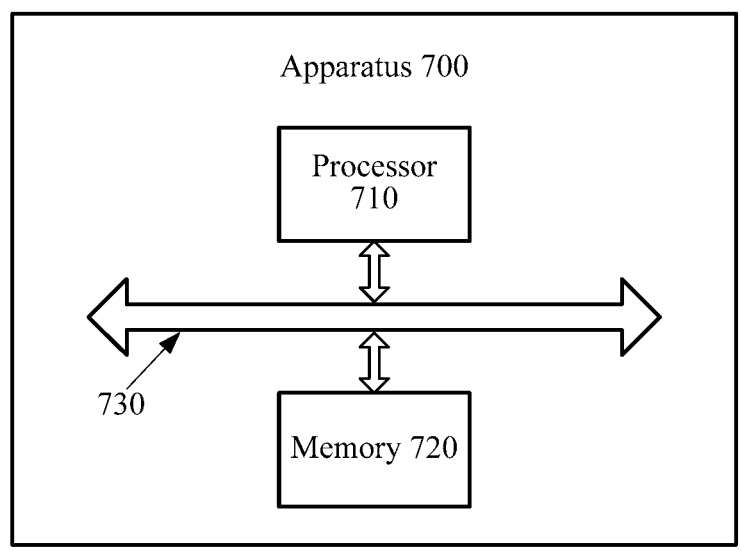
FIG. 13 is another schematic block diagram of an apparatus for determining a performance indicator of a communications network according to an embodiment of the present disclosure.

As shown in FIG. 13, an embodiment of the present disclosure further provides an apparatus 700 for determining a performance indicator of a communications network. The apparatus 700 includes a processor 710, a memory 720, and a bus system 730, where the processor 710 is connected to the memory 720 by using the bus system 730, the memory 720 is configured to store an instruction, and the processor 710 is configured to execute the instruction stored in the memory 720. The processor 710 is configured to:

acquire bandwidth utilization rates of multiple areas included in a communications network, throughputs of guaranteed bit rate GBR services of the multiple areas, and throughputs of non-GBR services of the multiple areas;

determine load statuses of the multiple areas according to the bandwidth utilization rates of the multiple areas;

determine rate requirements of the non-GBR services of the multiple areas according to the load statuses of the multiple areas, the throughputs of the GBR services of the multiple areas, and the throughputs of the non-GBR services of the multiple areas;

determine rate requirements of the GBR services of the multiple areas;

determine loads of the multiple areas according to the rate requirements of the GBR services of the multiple areas and the rate requirements of the non-GBR services of the multiple areas; and determine a load-associated key performance indicator KPI of the communications network according to the loads of the multiple areas.

Therefore, with the apparatus for determining a performance indicator of a communications network in this embodiment of the present disclosure, load statuses of areas are determined, and rate requirements of GBR services and rate requirements of non-GBR services of the areas are determined based on the load statuses, throughputs of the GBR services, and throughputs of the non-GBR services of the areas, so that loads can be accurately estimated, and accordingly, accuracy of calculation of a network performance indicator can be improved, and network performance can be improved.

In the embodiments of the present disclosure, the processor 710 may be a central processing unit ("CPU"), or the processor 710 may be another general purpose processor, a digital signal processor ("DSP"), an application-specific integrated circuit ("ASIC"), a field programmable gate array ("FPGA"), or another programmable logical device, discrete gate or transistor logical device, discrete hardware component, or the like. A general purpose processor may be a microprocessor or the processor may be any conventional processor and the like.

The memory 720 may include a read-only memory and a random access memory, and provides an instruction and data to the processor 710. A part of the memory 720 may further include a non-volatile random access memory. For example, the memory 720 may further store information about a device type.

In addition to including a data bus, the bus system 730 may further include a power bus, a control bus, a status signal bus, and the like. However, for clear description, various types of buses in the figure are marked as the bus system 730.

In an implementation process, each step of the foregoing method may be implemented by a hardware integrated logic circuit in the processor 710 or by an instruction in a software form. Steps of the methods disclosed with reference to the embodiments of the present disclosure may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 720, and the processor 710 reads information in the memory 720 and completes the steps in the foregoing methods in combination with hardware of the processor. To avoid repetition, details are not described herein again.

Optionally, as an embodiment, the determining, by the processor 710, load statuses of the multiple areas includes:

determining an average bandwidth utilization rate and an overload degree of each area in the multiple areas according to the bandwidth utilization rates of the multiple areas; and determining an overload status of each area in the multiple areas according to the average bandwidth utilization rate and the overload degree.

Optionally, as an embodiment, the determining, by the processor 710, rate requirements of the non-GBR services of the multiple areas includes:

determining service requirement ratios of non-overloaded areas in the multiple areas according to the throughputs of the GBR services of the multiple areas and the throughputs of the non-GBR services of the multiple areas, where the service requirement ratios represent ratios of the rate requirements of the non-GBR services to the rate requirements of the GBR services;

determining service requirement ratios of overloaded areas in the multiple areas according to the service requirement ratios of the non-overloaded areas in the multiple areas; and determining a rate requirement of a non-GBR service of each area in the multiple areas according to the service requirement ratios of the non-overloaded areas in the multiple areas, the service requirement ratios of the overloaded areas in the multiple areas, the throughputs of the GBR services of the multiple areas, and the throughputs of the non-GBR services of the multiple areas.

Optionally, as an embodiment, the communications network includes multiple cells, each cell includes one or more sub-areas, each sub-area includes one or more pixels, and when areas in the multiple areas are sub-areas, the determining, by the processor 710, rate requirements of the non-GBR services of the multiple areas includes:

determining, according to throughputs of GBR services of pixels included in the multiple sub-areas and throughputs of non-GBR services of the pixels included in the multiple sub-areas, service requirement ratios of pixels included in non-overloaded sub-areas in the multiple sub-areas, where the service requirement ratios of the pixels represent ratios of rate requirements of the non-GBR services of the pixels to rate requirements of the GBR services of the pixels;

determining, according to the service requirement ratios of the pixels included in the non-overloaded sub-areas, service requirement ratios of pixels included in overloaded sub-areas in the multiple sub-areas;

determining, according to the service requirement ratios of the pixels included in the non-overloaded sub-areas, the service requirement ratios of the pixels included in the overloaded sub-areas, the throughputs of the GBR services of the pixels included in the multiple sub-areas, and the throughputs of the non-GBR services of the pixels included in the multiple sub-areas, rate requirements of the non-GBR services of the pixels included in the multiple sub-areas; and determining a sum of rate requirements of non-GBR services of pixels separately included in each sub-area as a rate requirement of a non-GBR service of each of the sub-areas.

Optionally, as an embodiment, the determining, by the processor 710, a rate requirement of a non-GBR service of each area in the multiple areas includes:

determining a rate requirement of a GBR service of each area in the multiple areas according to a throughput of the GBR service of each area in the multiple areas;

determining an initial value of the rate requirement of the non-GBR service of each area in the multiple areas according to the service requirement ratios of the non-overloaded areas in the multiple areas, the service requirement ratios of the overloaded areas in the multiple areas, and the rate requirement of the GBR service of each area in the multiple areas; and determining the rate requirement of the non-GBR service of each area in the multiple areas according to a throughput of the non-GBR service of each area in the multiple areas and the initial value of the rate requirement of the non-GBR service of each area in the multiple areas.

Optionally, as an embodiment, the determining, by the processor 710, rate requirements of the GBR services of the multiple areas includes:

separately determining the throughput of the GBR service of each area in the multiple areas as the rate requirement of the GBR service of each of the areas.

Optionally, as an embodiment, the determining, by the processor 710, loads of the multiple areas includes:

determining an estimated load and a service load ratio of each area in the multiple areas according to the rate requirements of the GBR services of the multiple areas and the rate requirements of the non-GBR services of the multiple areas; and separately determining a GBR service load and a non-GBR service load of each of the areas in the multiple areas according to the estimated load and the service load ratio of each of the areas.

Optionally, as an embodiment, the determining, by the processor 710, a load-associated key performance indicator KPI of the communications network includes:

determining the load-associated key performance indicator KPI of the communications network according to GBR service loads and/or non-GBR service loads of the multiple areas, where the KPI includes at least one indicator of the following indicators: an average load of the communications network, an average signal-to-interference-plus-noise ratio SINR of the communications network, a call drop and block rate of the communications network, and a throughput of the communications network.

The apparatus 700 for determining a performance indicator of a communications network according to this embodiment of the present disclosure may correspond to an entity executing the methods in the foregoing embodiments of the present disclosure, and may also correspond to the apparatus 500 for determining a performance indicator of a communications network according to the foregoing embodiment of the present disclosure, where the foregoing and other operations and/or functions of modules in the apparatus 500 are separately used to implement corresponding procedures of the methods in FIG. 1 to FIG. 6. For brevity, details are not described herein again.

Therefore, with the apparatus for determining a performance indicator of a communications network in this embodiment of the present disclosure, load statuses of areas are determined, and rate requirements of GBR services and rate requirements of non-GBR services of the areas are determined based on the load statuses, throughputs of the GBR services, and throughputs of the non-GBR services of the areas, so that loads can be accurately estimated, and accordingly, accuracy of calculation of a network performance indicator can be improved, and network performance can be improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, and may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a performance indicator of a communications network, comprising:
   acquiring bandwidth utilization rates of multiple areas comprised in a communications network, throughputs of guaranteed bit rate (GBR) services of the multiple areas, and throughputs of non-GBR services of the multiple areas;
   determining load statuses of the multiple areas according to the bandwidth utilization rates of the multiple areas;
   determining rate requirements of the non-GBR services of the multiple areas according to the load statuses of the multiple areas, the throughputs of the GBR services of the multiple areas, and the throughputs of the non-GBR services of the multiple areas;
   determining rate requirements of the GBR services of the multiple areas;
   determining loads of the multiple areas according to the rate requirements of the GBR services of the multiple areas and the rate requirements of the non-GBR services of the multiple areas; and determining a load-associated key performance indicator (KPI) of the communications network according to the loads of the multiple areas.

2. The method according to claim 1, wherein determining the load statuses of the multiple areas comprises:

determining an average bandwidth utilization rate and an overload degree of each area in the multiple areas according to the bandwidth utilization rates of the multiple areas; and determining an overload status of each area in the multiple areas according to the average bandwidth utilization rate and the overload degree.

3. The method according to claim 1, wherein determining the rate requirements of the non-GBR services of the multiple areas comprises:

determining service requirement ratios of non-overloaded areas in the multiple areas according to the throughputs of the GBR services of the multiple areas and the throughputs of the non-GBR services of the multiple areas, wherein the service requirement ratios represent ratios of the rate requirements of the non-GBR services to the rate requirements of the GBR services;

determining service requirement ratios of overloaded areas in the multiple areas according to the service requirement ratios of the non-overloaded areas in the multiple areas; and determining a rate requirement of a non-GBR service of each area in the multiple areas according to the service requirement ratios of the non-overloaded areas in the multiple areas, the service requirement ratios of the overloaded areas in the multiple areas, the throughputs of the GBR services of the multiple areas, and the throughputs of the non-GBR services of the multiple areas.

4. The method according to claim 1, wherein the communications network comprises multiple cells, each cell comprises one or more sub-areas, each sub-area comprises one or more pixels, and when areas in the multiple areas are sub-areas, and determining the rate requirements of the non-GBR services of the multiple areas comprises:

determining, according to throughputs of GBR services of pixels comprised in the multiple sub-areas and throughputs of non-GBR services of the pixels comprised in the multiple sub-areas, service requirement ratios of pixels comprised in non-overloaded sub-areas in the multiple sub-areas, wherein the service requirement ratios of the pixels represent ratios of rate requirements of the non-GBR services of the pixels to rate requirements of the GBR services of the pixels;

determining, according to the service requirement ratios of the pixels comprised in the non-overloaded sub-areas, service requirement ratios of pixels comprised in overloaded sub-areas in the multiple sub-areas;

determining, according to the service requirement ratios of the pixels comprised in the non-overloaded sub-areas, the service requirement ratios of the pixels comprised in the overloaded sub-areas, the throughputs of the GBR services of the pixels comprised in the multiple sub-areas, and the throughputs of the non-GBR services of the pixels comprised in the multiple sub-areas, rate requirements of the non-GBR services of the pixels comprised in the multiple sub-areas; and determining a sum of rate requirements of non-GBR services of pixels separately comprised in each sub-area as a rate requirement of a non-GBR service of each of the sub-areas.

5. The method according to claim 3, wherein determining the rate requirement of the non-GBR service of each area in the multiple areas comprises:

determining a rate requirement of a GBR service of each area in the multiple areas according to a throughput of the GBR service of each area in the multiple areas;

determining an initial value of the rate requirement of the non-GBR service of each area in the multiple areas according to the service requirement ratios of the non-overloaded areas in the multiple areas, the service requirement ratios of the overloaded areas in the multiple areas, and the rate requirement of the GBR service of each area in the multiple areas; and determining the rate requirement of the non-GBR service of each area in the multiple areas according to a throughput of the non-GBR service of each area in the multiple areas and the initial value of the rate requirement of the non-GBR service of each area in the multiple areas.

6. The method according to claim 3, wherein determining the rate requirements of the GBR services of the multiple areas comprises:

separately determining the throughput of the GBR service of each area in the multiple areas as the rate requirement of the GBR service of each of the areas.

7. The method according to claim 1, wherein determining the loads of the multiple areas comprises:

determining an estimated load and a service load ratio of each area in the multiple areas according to the rate requirements of the GBR services of the multiple areas and the rate requirements of the non-GBR services of the multiple areas; and separately determining a GBR service load and a non-GBR service load of each of the areas in the multiple areas according to the estimated load and the service load ratio of each of the areas.

8. The method according to claim 7, wherein determining the load-associated KPI of the communications network comprises:

determining the load-associated KPI of the communications network according to GBR service loads and/or non-GBR service loads of the multiple areas, wherein the load-associated KPI comprises at least one indicator of the following indicators: an average load of the communications network, an average signal-to-interference-plus-noise ratio (SINR) of the communications network, a call drop and block rate of the communications network, and a throughput of the communications network.

9. The method according to claim 2, wherein determining the rate requirements of the non-GBR services of the multiple areas comprises:

determining service requirement ratios of non-overloaded areas in the multiple areas according to the throughputs of the GBR services of the multiple areas and the throughputs of the non-GBR services of the multiple areas, wherein the service requirement ratios represent ratios of the rate requirements of the non-GBR services to the rate requirements of the GBR services;

determining service requirement ratios of overloaded areas in the multiple areas according to the service requirement ratios of the non-overloaded areas in the multiple areas; and determining a rate requirement of a non-GBR service of each area in the multiple areas according to the service requirement ratios of the non-overloaded areas in the multiple areas, the service requirement ratios of the overloaded areas in the multiple areas, the throughputs of the GBR services of the multiple areas, and the throughputs of the non-GBR services of the multiple areas.

10. The method according to claim 2, wherein the communications network comprises multiple cells, each cell comprises one or more sub-areas, each sub-area comprises one or more pixels, and when areas in the multiple areas are sub-areas, the determining rate requirements of the non-GBR services of the multiple areas comprises:

determining, according to throughputs of GBR services of pixels comprised in the multiple sub-areas and throughputs of non-GBR services of the pixels comprised in the multiple sub-areas, service requirement ratios of pixels comprised in non-overloaded sub-areas in the multiple sub-areas, wherein the service requirement ratios of the pixels represent ratios of rate requirements of the non-GBR services of the pixels to rate requirements of the GBR services of the pixels;

determining, according to the service requirement ratios of the pixels comprised in the non-overloaded sub-areas, service requirement ratios of pixels comprised in overloaded sub-areas in the multiple sub-areas;

determining, according to the service requirement ratios of the pixels comprised in the non-overloaded sub-areas, the service requirement ratios of the pixels comprised in the overloaded sub-areas, the throughputs of the GBR services of the pixels comprised in the multiple sub-areas, and the throughputs of the non-GBR services of the pixels comprised in the multiple sub-areas, rate requirements of the non-GBR services of the pixels comprised in the multiple sub-areas; and determining a sum of rate requirements of non-GBR services of pixels separately comprised in each sub-area as a rate requirement of a non-GBR service of each of the sub-areas.

11. An apparatus for determining a performance indicator of a communications network, comprising:
a processor; and
a memory having a plurality of computer executable instructions stored thereon, when executed by the processor, that cause the processor to implement
acquiring bandwidth utilization rates of multiple areas comprised in a communications network, throughputs of guaranteed bit rate (GBR) services of the multiple areas, and throughputs of non-GBR services of the multiple areas;
determining load statuses of the multiple areas according to the bandwidth utilization rates of the multiple areas;
determining rate requirements of the non-GBR services of the multiple areas according to the load statuses of the multiple areas, the throughputs of the GBR services of the multiple areas, and the throughputs of the non-GBR services of the multiple areas;
determining rate requirements of the GBR services of the multiple areas;
determining loads of the multiple areas according to the rate requirements of the GBR services of the multiple areas and the rate requirements of the non-GBR services of the multiple areas; and determining a load-associated key performance indicator (KPI) of the communications network according to the loads of the multiple areas.

12. The apparatus according to claim 11, wherein the processor is further configured to implement:
determining an average bandwidth utilization rate and an overload degree of each area in the multiple areas according to the bandwidth utilization rates of the multiple areas; and
determining an overload status of each area in the multiple areas according to the average bandwidth utilization rate and the overload degree.

13. The apparatus according to claim 11, wherein the processor is further configured to implement:
determining service requirement ratios of non-overloaded areas in the multiple areas according to the throughputs of the GBR services of the multiple areas and the throughputs of the non-GBR services of the multiple areas, wherein the service requirement ratios represent ratios of the rate requirements of the non-GBR services to the rate requirements of the GBR services;
determining service requirement ratios of overloaded areas in the multiple areas according to the service requirement ratios of the non-overloaded areas in the multiple areas; and
determining a rate requirement of a non-GBR service of each area in the multiple areas according to the service requirement ratios of the non-overloaded areas in the multiple areas, the service requirement ratios of the overloaded areas in the multiple areas, the throughputs of the GBR services of the multiple areas, and the throughputs of the non-GBR services of the multiple areas.

14. The apparatus according to claim 11, wherein the processor is further configured to implement:
determining, according to throughputs of GBR services of pixels comprised in the multiple sub-areas and throughputs of non-GBR services of the pixels comprised in the multiple sub-areas, service requirement ratios of pixels comprised in non-overloaded sub-areas in the multiple sub-areas, wherein the service requirement ratios of the pixels represent ratios of rate requirements of the non-GBR services of the pixels to rate requirements of the GBR services of the pixels;
determining, according to the service requirement ratios of the pixels comprised in the non-overloaded sub-areas, service requirement ratios of pixels comprised in overloaded sub-areas in the multiple sub-areas;
determining, according to the service requirement ratios of the pixels comprised in the non-overloaded sub-areas, the service requirement ratios of the pixels comprised in the overloaded sub-areas, the throughputs of the GBR services of the pixels comprised in the multiple sub-areas, and the throughputs of the non-GBR services of the pixels comprised in the multiple sub-areas, rate requirements of the non-GBR services of the pixels comprised in the multiple sub-areas; and
determining a sum of rate requirements of non-GBR services of pixels separately comprised in each sub-area as a rate requirement of a non-GBR service of each of the sub-areas.

15. The apparatus according to claim 13, wherein the processor is further configured to implement:
determining a rate requirement of a GBR service of each area in the multiple areas according to a throughput of the GBR service of each area in the multiple areas;

determining an initial value of the rate requirement of the non-GBR service of each area in the multiple areas according to the service requirement ratios of the non-overloaded areas in the multiple areas, the service requirement ratios of the overloaded areas in the multiple areas, and the rate requirement of the GBR service of each area in the multiple areas; and determining the rate requirement of the non-GBR service of each area in the multiple areas according to a throughput of the non-GBR service of each area in the multiple areas and the initial value of the rate requirement of the non-GBR service of each area in the multiple areas.

16. The apparatus according to claim 13, wherein the processor is further configured to implement:

separately determining the throughput of the GBR service of each area in the multiple areas as the rate requirement of the GBR service of each of the areas.

17. The apparatus according to claim 11, wherein the processor is further configured to implement:

determining an estimated load and a service load ratio of each area in the multiple areas according to the rate requirements of the GBR services of the multiple areas and the rate requirements of the non-GBR services of the multiple areas; and separately determining a GBR service load and a non-GBR service load of each of the areas in the multiple areas according to the estimated load and the service load ratio of each of the areas.

18. The apparatus according to claim 17, wherein the processor is further configured to implement:

determining the load-associated KPI of the communications network according to GBR service loads and/or non-GBR service loads of the multiple areas, wherein the load-associated KPI comprises at least one indicator of the following indicators: an average load of the communications network, an average signal-to-interference-plus-noise ratio (SINR) of the communications network, a call drop and block rate of the communications network, and a throughput of the communications network.

19. The apparatus according to claim 12, wherein the processor is further configured to implement:

determining service requirement ratios of non-overloaded areas in the multiple areas according to the throughputs of the GBR services of the multiple areas and the throughputs of the non-GBR services of the multiple areas, wherein the service requirement ratios represent ratios of the rate requirements of the non-GBR services to the rate requirements of the GBR services;

determining service requirement ratios of overloaded areas in the multiple areas according to the service requirement ratios of the non-overloaded areas in the multiple areas; and determining a rate requirement of a non-GBR service of each area in the multiple areas according to the service requirement ratios of the non-overloaded areas in the multiple areas, the service requirement ratios of the overloaded areas in the multiple areas, the throughputs of the GBR services of the multiple areas, and the throughputs of the non-GBR services of the multiple areas.

20. The apparatus according to claim 12, wherein the processor is further configured to implement:

determining, according to throughputs of GBR services of pixels comprised in the multiple sub-areas and throughputs of non-GBR services of the pixels comprised in the multiple sub-areas, service requirement ratios of pixels comprised in non-overloaded sub-areas in the multiple sub-areas, wherein the service requirement ratios of the pixels represent ratios of rate requirements of the non-GBR services of the pixels to rate requirements of the GBR services of the pixels;

determining, according to the service requirement ratios of the pixels comprised in the non-overloaded sub-areas, service requirement ratios of pixels comprised in overloaded sub-areas in the multiple sub-areas;

determining, according to the service requirement ratios of the pixels comprised in the non-overloaded sub-areas, the service requirement ratios of the pixels comprised in the overloaded sub-areas, the throughputs of the GBR services of the pixels comprised in the multiple sub-areas, and the throughputs of the non-GBR services of the pixels comprised in the multiple sub-areas, rate requirements of the non-GBR services of the pixels comprised in the multiple sub-areas; and determining a sum of rate requirements of non-GBR services of pixels separately comprised in each sub-area as a rate requirement of a non-GBR service of each of the sub-areas.

\* \* \* \* \*